(12) United States Patent
Chen

(10) Patent No.: US 7,574,703 B2
(45) Date of Patent: Aug. 11, 2009

(54) METHOD AND APPARATUS FOR REDUCING INSTRUCTION DEPENDENCIES IN EXTENDED SSA FORM INSTRUCTIONS

(75) Inventor: Gang Chen, Marlboro, MA (US)

(73) Assignee: Broadcom Corporation, Irvine, CA (US)

( * ) Notice: Subject to any disclaimer, the term of this patent is extended or adjusted under 35 U.S.C. 154(b) by 809 days.

(21) Appl. No.: 10/954,586

(22) Filed: Sep. 30, 2004

(65) Prior Publication Data

US 2006/0070050 A1    Mar. 30, 2006

(51) Int. Cl.
G06F 9/45      (2006.01)

(52) U.S. Cl. .................. 717/152; 717/140; 717/141; 717/151; 717/154

(58) Field of Classification Search ................. 717/146, 717/149, 151, 155–157, 161, 159, 152, 154
See application file for complete search history.

(56) References Cited

U.S. PATENT DOCUMENTS

| | | | | |
|---|---|---|---|---|
| 5,884,060 A * | 3/1999 | Vegesna et al. | ............. | 712/215 |
| 5,999,735 A * | 12/1999 | Radigan | .................... | 717/152 |
| 6,026,241 A * | 2/2000 | Chow et al. | ................. | 717/152 |
| 6,077,314 A * | 6/2000 | Ng | .............................. | 717/159 |
| 6,151,706 A * | 11/2000 | Lo et al. | ..................... | 717/155 |
| 6,182,284 B1 * | 1/2001 | Sreedhar et al. | ............. | 717/146 |
| 6,249,910 B1 * | 6/2001 | Ju et al. | ....................... | 717/146 |
| 6,286,135 B1 * | 9/2001 | Santhanam | .................. | 717/146 |
| 6,571,387 B1 | 5/2003 | Chow et al. | | |
| 7,278,137 B1 * | 10/2007 | Fuhler et al. | ................. | 717/153 |
| 7,353,503 B2 * | 4/2008 | Nair et al. | .................... | 717/151 |
| 2004/0098710 A1 * | 5/2004 | Radigan | ...................... | 717/144 |
| 2004/0243790 A1 * | 12/2004 | Soltis et al. | ................. | 712/225 |
| 2005/0273777 A1 * | 12/2005 | Grover et al. | ............... | 717/151 |

OTHER PUBLICATIONS

Cytron, Ron et al.; Efficiently Computing Static Single Assignment Form and the Control Dependence Graph; ACM Transactions on Programming Languages and Systems; Oct. 1991; pp. 451-490; vol. 13, No. 4.
U.S. Appl. No. 10/767,480, filed Jan. 28, 2004; Norman Rubin et al.; "Method and Apparatus for Static Single Assignment Form Dead Code Elimination".

* cited by examiner

*Primary Examiner*—Insun Kang
(74) *Attorney, Agent, or Firm*—McAndrews, Held & Malloy, Ltd

(57) ABSTRACT

A method and apparatus for reducing instruction dependencies in extended SSA form instructions includes examining a first instruction of a worklist. The worklist contains instructions in the extended SSA form that have a source, a previous link and a write mask and further produce an output. The method and apparatus further includes examining at least one second instruction of the worklist, where the at least one second instruction is a source of the first instruction. Lastly, the method and apparatus includes translating the plurality of instructions in the worklist into a second plurality of instructions in the extended SSA form where the second plurality of instructions contains less instruction dependencies such as previous links.

45 Claims, 17 Drawing Sheets

- PRIOR ART -

- PRIOR ART -

- PRIOR ART -

- PRIOR ART -

- PRIOR ART -

| WORKLIST ||||
| --- | --- | --- | --- |
| NO. | FIRST PLURALITY | NO. | SECOND PLURALITY |
| 0 | If b == 0 | 0 | If b == 0 |
| 1 | R1.xy__ = C1 | 1 | R1.xy__ = C1 |
| 2 | R2.__zw = C2 @ R1.xyzw | 2 | R2.__zw = C2 |
| 3 | R3.xy__ = C3 | 3 | R3.xy__ = C3 |
| 4 | R4.__zw = C4 @ R3.xyzw | 4 | R4.__zw = C4 |
| 5 | R5.xyzw = PHI (R2, R4) | 5 | R5.xy__ = PHI (R1, R3) |
| 6 | R6.xyzw = R5.xyxy + R5.zwzw | 7 | R7.__zw = PHI (R2, R4) |
|   |   | 6 | R6.xyzw = R5.xyxy + R7.wzwz |

| NEW PREV. LINK TABLE | | |
|---|---|---|
| NO. | PREV. LINK_initial | PREV. LINK_updated |
| 0 | NULL | NULL |
| 1 | NULL | NULL |
| 2 | NULL | NULL |
| 3 | NULL | NULL |
| 4 | NULL | NULL |
| 5 | NULL | NULL |
| 6 | NULL | NULL |

FIG. 9D

| INSTRUCTION GROUPING TABLE 808 ||
|---|---|---|
| NO. | GROUP ID_initial | GROUP ID_updated |
| 0 | 0 | 0 |
| 1 | 1 | 1 |
| 2 | 2 | 2 |
| 3 | 3 | 3 |
| 4 | 4 | 4 |
| 5 | 5 | 5 |
| 6 | 6 | 6 |

FIG. 9E

| PHI-OUTPUT GROUPING TABLE | |
|---|---|
| NO | 5 |
| x_initial | 0 |
| x_updated | 0 |
| y_initial | 1 |
| y_updated | 0 |
| z_initial | 2 |
| z_updated | 2 |
| w_initial | 3 |
| w_updated | 2 |

FIG. 9F

METHOD AND APPARATUS FOR REDUCING INSTRUCTION DEPENDENCIES IN EXTENDED SSA FORM INSTRUCTIONS

FIELD OF THE INVENTION

The invention relates generally to a method and apparatus for reducing instruction dependencies, and more particularly to reducing instruction dependencies in SSA form instructions as utilized within a compiler.

BACKGROUND OF THE INVENTION

In a computer system, a program known as a compiler is utilized to translate software programs expressed in high order programming languages into their machine language equivalents. A processor then may execute the machine language to perform the operations designated by the software program. However, inefficiencies arise when using compilers due to the presence of instruction dependencies inherent with instructions in the extended static single assignment (SSA) form.

Instructions in the extended SSA form may suffer from having unnecessary data elements such as previous links that 'link' a portion of a particular instruction to a previously written instruction. In certain embodiments, a first plurality of instructions in the extended SSA form may contain multiple previous links that are essentially redundant to the extent that if instruction operands or sources were re-written, various previous links could be eliminated from the plurality of instructions.

By reducing instruction dependencies such as previous links in the extended SSA form, the updated plurality of instructions in the extended SSA form would have fewer constraints and therefore provide freedom for instruction scheduling and register allocation. For example, the reduction of instruction dependencies would allow non-sequential execution of instructions due to unnecessary previous links and further allow components of a given register to be assigned to different physical superword registers.

Therefore, a need exists for a compiler to identify and eliminate unnecessary instruction redundancies in an extended SSA form. A further need exists to re-write instruction operands to facilitate the process of reducing unnecessary instruction redundancies.

BRIEF DESCRIPTION OF THE DRAWINGS

The invention will be more readily understood in view of the following description when accompanied by the below figures and wherein like reference numerals represent like elements:

FIGS. 9C-9F illustrate schematic block diagrams of memory tables as utilized to reduce instruction dependencies of a first plurality of instructions and translate the first plurality into a second plurality of instructions as shown in FIGS. 9A-9B.

DETAILED DESCRIPTION OF A PREFERRED EMBODIMENT

Generally, a method is disclosed for reducing instruction dependencies in the extended static single assignment (SSA) form in which the instructions are converted from instructions that utilize superword registers. The method requires the use of a worklist that points to a first plurality of stored instructions in the extended SSA form. Each instruction identified in the worklist contains data representing a source, a previous link and a write mask. Furthermore, each worklist instruction produces a data output. The method requires an examination of a first instruction and at least one or more second instructions. At least one of the second instructions is a source of the first instruction. In other words, at least one of the second instructions has a data output that is used as an operand in the first instruction.

After examining each instruction, the method translates the first plurality of instructions into a second plurality of instructions in the extended SSA form such that the second plurality of instructions contains less dependencies. As a result, the second plurality of instructions can be executed more efficiently by the host processor.

As background to the present invention, FIGS. 1-5 illustrate by way of example a method of producing a set of instructions in the extended SSA form.

Figure 1:
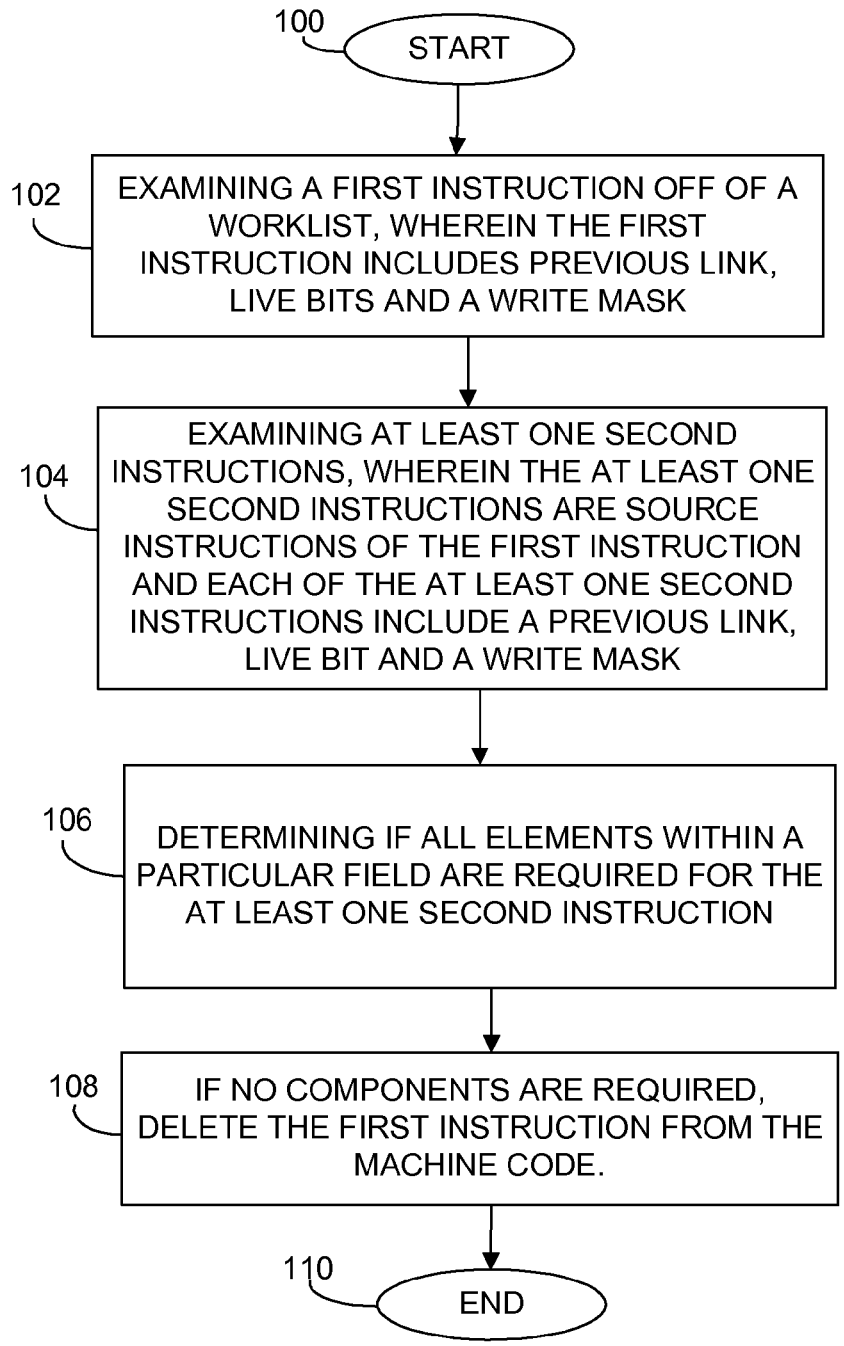
FIG. 1 illustrates a flowchart of a method for dead code elimination in accordance with the prior art.

FIG. 1 illustrates the steps of one embodiment of a method for eliminating dead code. The method begins, step 100, by examining a first instruction off of a worklist, wherein the first instruction includes a previous link, live bits and a write mask, step 102. A standard instruction includes a first term and a second term, wherein the instructions disposed on the worklist have the three additional fields added thereto. The previous link is a field that indicates a previous instruction and the write mask allows for operation and coordination of instructions with a superword register. The live bits indicate components produced by this instruction or by a prior instruction that can be reached via the previous write link. As the superword register has a plurality of elements, the write mask coordinates instructions with specific components. This allows for operation of compiler operations such as a swizzle and maintenance of element-specific based calculations.

The first instruction is examined to determine if any of the elements are live for a particular calculation. If a particular element is not live, this indicates that this instruction is dead code and should be eliminated from the generated machine code. Step 104 is examining one or more second instructions, wherein the one or more second instructions are source instructions of the first instruction and each of the at least one second instructions include a previous link, a set of live bits and a write mask. The previous link, live bits and the write mask of the one or more second instructions have the same structure of the previous link, live bits and the write mask as the first instruction pulled off of the worklist.

Step 106 is determining if all elements within a particular field are required for the at least one second instruction. This step is performed by looking at each element. In the embodiment having four elements, the x element is examined, the y element is examined, the z element is examined and the w element is examined to determine if the element is live. Also noting in the method and apparatus that with the operation of a swizzle function, the various elements may be representative of other specified elements.

Step 108 is deleting the first instruction from the machine code if no components are live. If no components are live, this means that this particular instruction is extraneous because result of this instruction are not used by another instruction. Thereupon, the method is complete, step 110.

Figure 2:
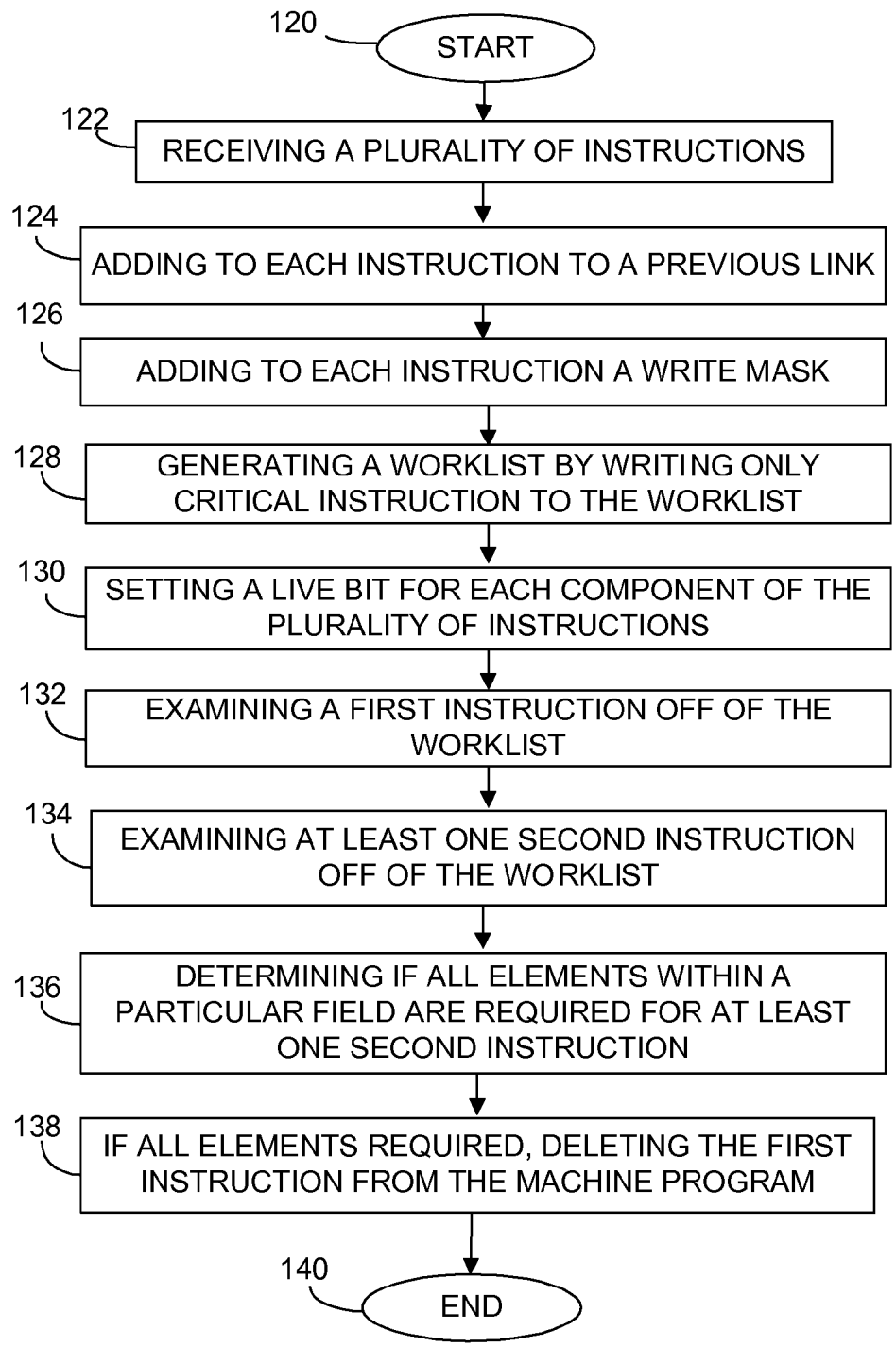
FIG. 2 illustrates a flowchart of a method for dead code elimination in accordance with the prior art.

FIG. 2 illustrates a further embodiment of a method for eliminating dead code. Similar to FIG. 1, this method is performed by a compiler operating to convert a program language software code into a machine language code, otherwise referred to as compiling the program language software. The method begins 120, by receiving a plurality of instructions, step 122. These instructions are in SSA form.

Step 124 is adding to each instruction a previous link. The previous link indicates a previous instruction that produces for various components within a multiple component resource. Step 126 is adding to each instruction a write mask. As discussed above, the write mask is an n-bit field and n is the number of components in a superword register. Step 128 is generating a worklist by writing only critical instructions to the worklist. This step is accomplished by examining each instruction and determining if the instruction directly produces a program output, then it is deemed critical.

Step 130 is setting a live bit for each component of the plurality of instructions. In one embodiment, this live bit is an n-bit field, where n is the number of components in the superword register and the live bit is true if it is known that the specific component, for example x, y, z or w, is not dead. Thereupon, step 132 of the method is examining a first instruction off of the worklist. In one embodiment, the step of examining the instruction includes walking backwards over the SSA links, steps defining particular instructions relative to a product, as discussed in greater detail in FIG. 5. The examination includes identifying all instructions that are needed as the source of the first instruction. Based on the operation of the instruction, any input swizzles and the write mask of the instruction, the examination includes identifying the bits that are required from a particular instruction.

Step 134 is examining further instructions off of the worklist. This method is an iterative process looking at multiple instructions to determine which instructions are extraneous, dead code. Therefore, step 136 is determining if all elements within a particular field are required for the subsequent instructions, the at least one second instructions. If no elements are required, step 138 is deleting the first instruction from the machine program, as this instruction is dead code. Thereupon, the method is complete, step 140.

It should also be noted that the maximum number of times any single instruction may be added to the worklist is the number of components within the superword register based on the rate of convergence. For example, if the superword register has four components, x, y, z and w, the instruction may be added only once for each component, and not necessarily the corresponding component but rather the component allocation due to swizzling. In other words, if a swizzle operation allocated the x component to the y component, the instruction may be added to the worklist based on the y component that is actually the x component, wherein the instruction may have been previously added to the list based on the x component.

Figure 3:
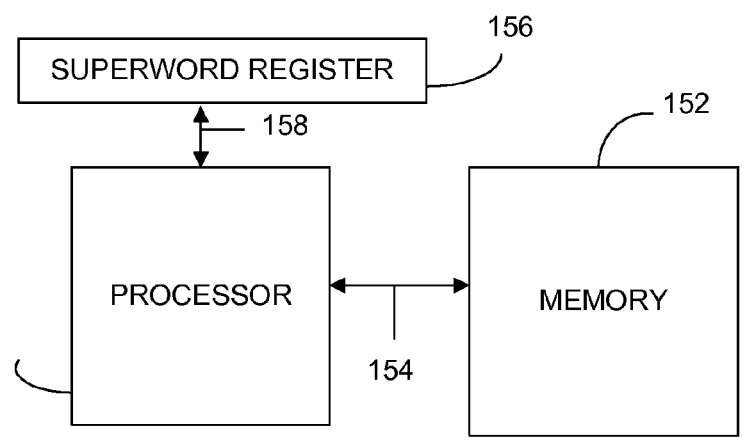
FIG. 3 illustrates a schematic block diagram of an apparatus for dead code elimination in accordance with the prior art.

FIG. 3 illustrates an apparatus for the elimination of dead code. A processor 150 is operatively coupled to a memory 152. The memory stores executable instructions 154 therein. The processor 150 may be, but not limited to, a single processor, a plurality of processors, a DSP, a microprocessor, an ASIC, a state machine, or any implementation capable of processing and executing software. The term processor should not be construed to refer exclusively to hardware capable of executing software, and may implicitly include DSP hardware, ROM for storing software, RAM, and any other volatile or non-volatile storage medium. The memory with executable instructions 152 may be, but not limited to, a single memory, a plurality of memory locations, shared memory, CD, DVD, ROM, RAM, EEPROM, optical storage, microcode or any other non-volatile storage capable of storing digital data for use by the processor 150.

The executable instructions 154 are provided to the processor 150 such that the processor 150 performs operations in response thereto. In one embodiment, the processor 150 performs compiler operations to convert programming language instructions into machine language instructions. The processor 150 is further operative to perform the steps of the methods illustrated in FIGS. 1 and 2 and processes discussed above as associated with the methods for dead code elimination. Therefore, the methods discussed above may be fully implemented and executed by the processor 150 in response to the executable instructions 154.

In one embodiment, the processor 150 is further coupled to one or more superword registers 156, wherein each superword register may be a single hardware resource capable of holding a limited number of words of data. The processor 150, through performing the method steps discussed above with regards to FIGS. 1 and 2, reads and writes register values 158 to the superword register for tracking the status of the various superword components.

Thereupon, once the processor 150 compiles program code software into machine language, the compiled instructions are then designated on a component level, for example x, y, z, and w. In the SIMD environment, the instructions may then be efficiently provided to their corresponding processors, such as an x component processor, a y component processor, a z component processor and a w component processor, using the superword register.

Figure 4:
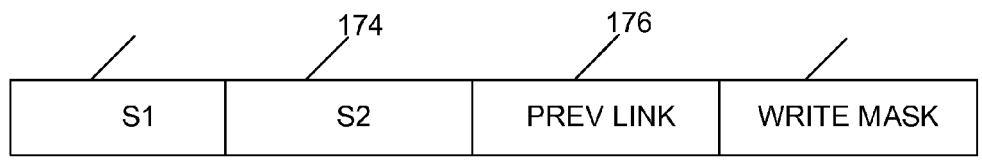
FIG. 4 illustrates a block diagram an instruction for use with a superword register in accordance with the prior art.

FIG. 4 illustrates a graphical representation of an instruction 170, in accordance with one embodiment. The instruction includes the two elements of the instruction, S1 172 and S2 174. Although the previous link field 176 is added, as well as the write mask 178. The added write mask 178 allows for usage of the instruction with the superword register based on tracking the superword register components. It should also be noted that in another embodiment, the instruction further includes a live bit, as discussed above.

Figure 5:
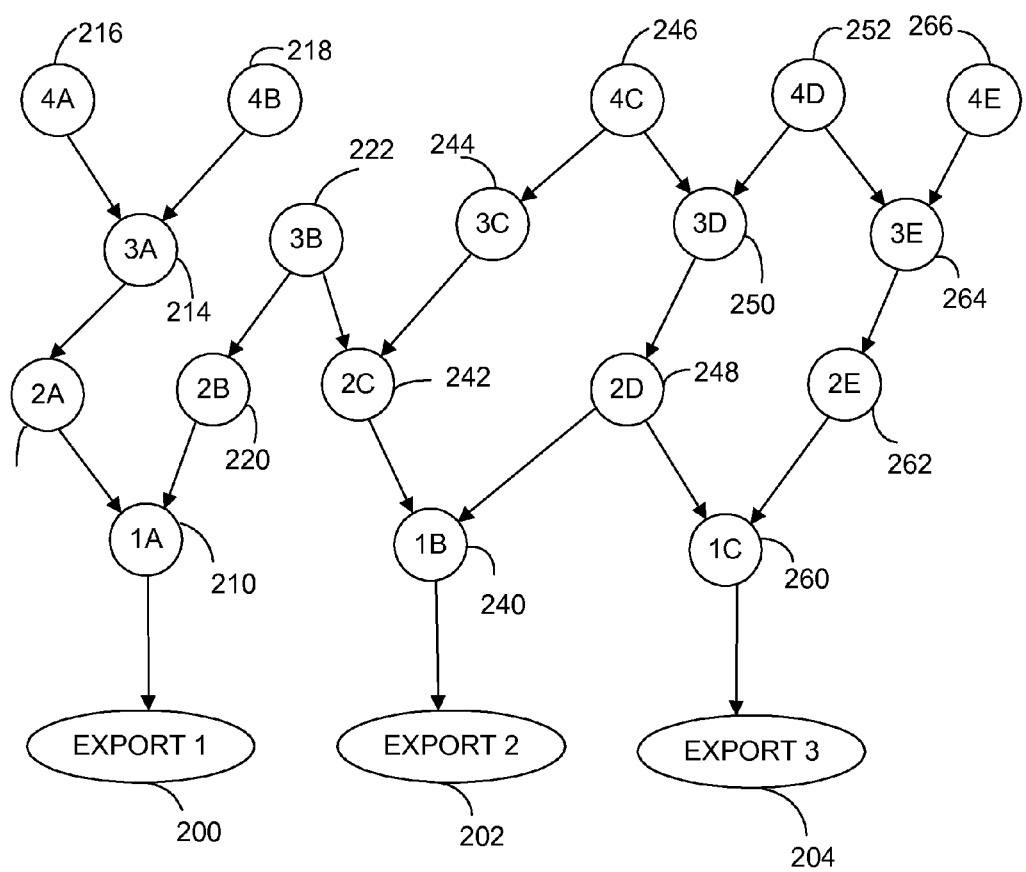
FIG. 5 illustrates a graphical representation of a plurality of decision trees of instructions and the elimination of dead code in accordance with the prior art.

FIG. 5 illustrates a graphical representation of a plurality of instructions that a typical compiler would optimize using the method and apparatus for eliminating dead code. The illustrated example include 3 exports, 200, 202 and 204, wherein the exports are some output value, such as a computed value computed by the natural progression of the steps from top to bottom.

For example, walking backwards across SSA links, export 1 200 is the result of instruction 1A 210. 1A 210 is the result of the combination of 2A 212 and 2B 220. Following the SSA links, 2A is the result of an operation with just 3A 214, which is the result of 4A 216 and 4B 218. Back down SSA links, 2B 220 is the result of 3B 222, and this fully covers this illustrative example of the steps subsequent to the production of export 1 200.

In the elimination of dead code and the instructions illustrated in FIG. 5 having SSA form, the worklist is utilized to identify steps that are dead code. Therefore, in examining export 2 202, this is the result of 1B 240. 1B 240 is the result of an operation with 2C 242 and 2D 248. Walking up the SSA links, element 2C 242 is the result of 3B 222 and 3C 244. As 3B does hot have any higher instructions, step 3C is examined as the result of 4C 246. Back down the SSA links, the second element for 1B 240 was 2D 248, which is the result of 3D 250, wherein 3D is the result of 4C 246 and 4D 252.

Following the progression of the third export 204, 1C 260 is based on 2D 248 and 2E 262. The instructions for 2D 248 were previously determined with respect to the second export 202, therefore, the steps above 2D may be removed as dead code using the previous bit, the write mask and in one embodiment the live bit for the SSA form instructions. With respect to 2E 262, this is the result of 3E 264 which is the result of 4D 252 and 4E 266. In the event there are any further instructions above 4D 252, these would have been determined upon inspection of the second export 202, therefore these instructions could also be eliminated as dead code.

As such, the present disclosure provides for the elimination of dead code in an SSA form instruction. Through the inclusion of the previous link value and the write mask, the instructions may be processed with a superword register for operation in a SIMD environment. Therefore, through the modified instructions, the superword register may be utilized and data may be more readily provided to SIMD processor executing machine language operating instructions.

Briefly, a method and apparatus for dead code elimination includes adding to each instruction (1) a set of bits called a write mask (one per component) used to indicate the components produced by the instruction, (2) a link called the "previous write" linking the instruction with the prior instruction writing components of the same superword, and (3) a set of bits (one per component) called live bits, indicating the components consumed by subsequent uses of the superword register and the instruction is in SSA form. Initially all live bits are set to false.

Instructions are processed from a worklist. The instruction may be any suitable executable instruction, such as but not limited to a mathematical instruction, for example addition, subtraction, multiplication, division, an equivalence instruction, for example a equals b, or any other suitable instruction found within a programming language for conversion by a compiler into a machine level language. Furthermore, a worklist is any suitable collection of instructions. The next step is to identify a set of critical instructions, wherein critical instructions are instructions that directly produce a program output. All critical instructions are placed on the worklist.

As each instruction I is removed from the worklist, a backward walk over the SSA links and partial write links, can be used to identify each instruction J which produce a source used by I. Based on the live bits in I, the corresponding live bits of J may be increased. If I uses a component produced by J and the live bits of J for that component are not set, then set the live bit for that component in instruction to on, and add J to the worklist.

The preceding computation is repeated until the worklist is empty.

In the method and apparatus, each of the instructions include a previous link, a list of live components and a write mask, where a previous link connects instructions that write different components of the same resource and the write mask is an n-bit field where n is determined by the number of elements of a superword register. For example, if a superword register allows for four components, this provides for a write mask having four bits, such as an instruction associated with an x, y, z and w field.

The method and apparatus further includes determining if all elements within a particular resource are required for the at least one second instruction. As discussed above, in one embodiment having 4 elements, a determination is made if the x field is required, if the y field is required, if the z field is required and if the w field is required. If all the elements are required, the method and apparatus provides for deleting the first instruction as it is determined that this instruction is extraneous, otherwise referred to as dead code. Therefore, the method and apparatus provides for elimination of dead code by examining the steps of the instructions in accordance with the parameters of the SSA based instructions.

While the description above illustrates, among other things, a method of producing an initial plurality of instructions in the extended SSA form, the description below with respect to FIGS. 6-9 illustrates a method and apparatus for reducing instruction dependencies in the extended SSA form.

Figure 6:
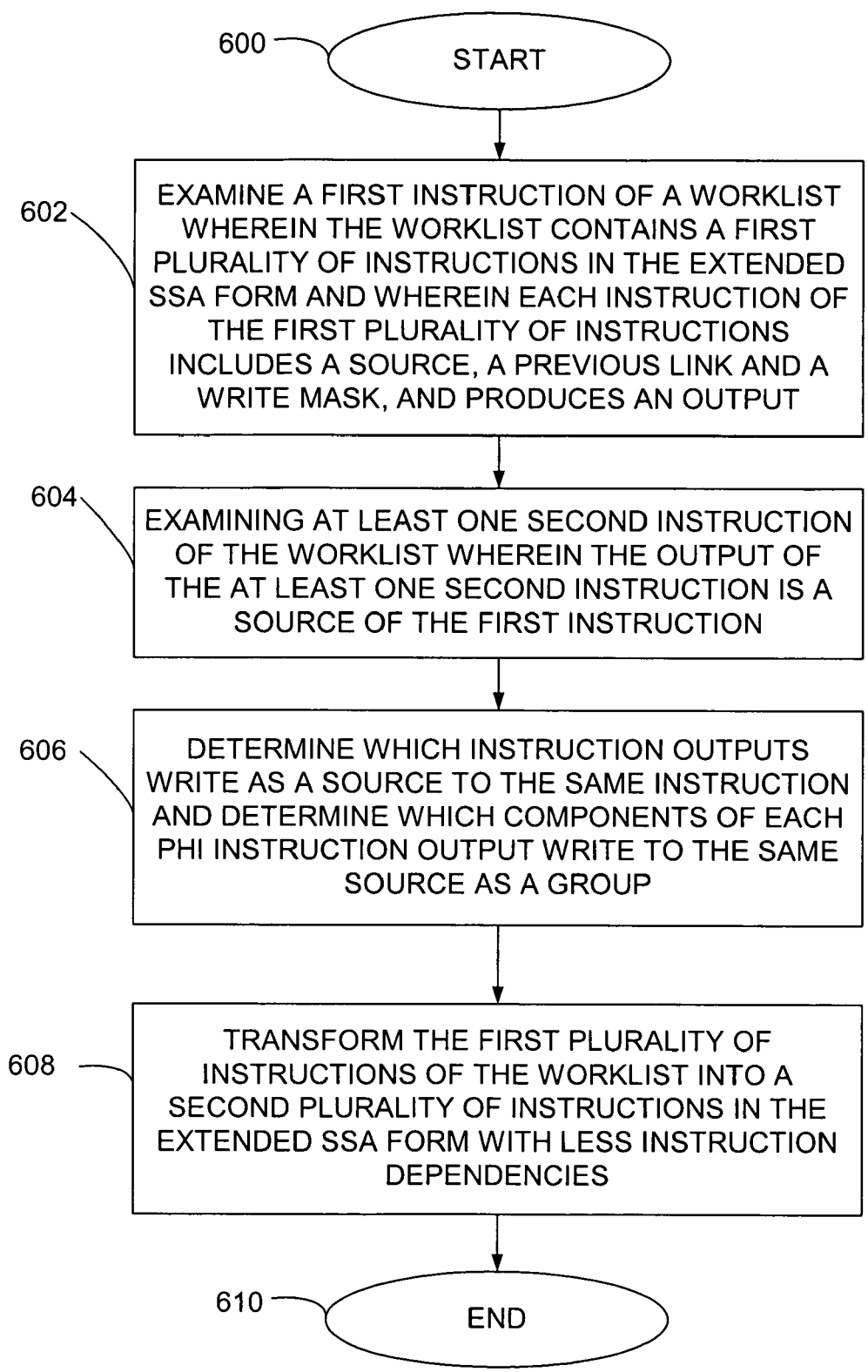
FIG. 6 illustrates a flow chart of a method for reducing instruction dependencies in the extended SSA form in accordance with one embodiment of the present invention.

FIG. 6 illustrates a flow chart of a method for reducing instruction dependencies in the extended SSA form in accordance with one embodiment of the present invention. The method is performed by a compiler executing on one or more processing devices (e.g., a host processor) or carried out by any suitable logic operating to convert program language software code into machine language code, otherwise referred to as compiling the program language software. The method begins at block 600 by examining a first instruction of a worklist stored in memory wherein the worklist contains a first plurality of instructions in the extended SSA form by containing pointers that point to respective instructions in SSA form, block 602. Each instruction of the first plurality of instructions includes, among other things, data representing at least one source, a previous link and a write mask. As used throughout this disclosure, the terms "source" and "operand" shall be synonyms and are data representing source or operand fields of an instruction. Similarly, the term "write mask" refers to an instruction field and the data contained therein. In addition, each instruction of the first plurality of instructions further produces a data output written to a virtual superword register. The present disclosure recognizes that each instruction of the first plurality of instructions may also contain one or more sources or operands and one or more live bits as described above with respect to FIGS. 1-5.

As used above and further explained below with reference to FIGS. 6-9, the previous link and write mask of each instruction work together to insure that all components of an instruction output can be written in full in a single instruction if desired. In one embodiment, each instruction output (corresponding to a virtual superword register) may contain four components, x, y, z and w. Using a write mask, the at least one source of each instruction will directly write a portion of the instruction output. Similarly, a previous link will point to a previously executed instruction to write the remaining portion of the instruction output.

As used throughout this disclosure and for purposes of example, the following is provided to illustrate the nomenclature associated with expressing instructions in the extended SSA form, and further to illustrate how the write mask and previous link operate in tandem to write each instruction in full.

Sample Instruction $R1.xy\_=R2.xyzw+R3.xyzw@R4.xyzw$

Solution & Explanation
Where $R1.xy=R2.xy+R3.xy$ (i.e., $R1.x=R2.x+R3.x$; $R1.y=R2.y+R3.y$)
Where $R1.zw=R4.zw$ (i.e., $R1.z=R4.z$; $R1.w=R4.w$)
  Where R1, R2, R3 and R4 correspond to virtual superword registers;
  Where R1 is an instruction output;
  Where R2 and R3 are sources from previously executed instructions;
  Where R4 is the previous link;
  Where the x and y components are directly written by the sources; and
  Where the z and w components are 'masked' and therefore written by the previous link.

This disclosure recognizes, however, that not every component is necessarily utilized by the program. As a result, a given previous link may be blank or filled by one or more null values.

Returning to block 604 of FIG. 6, the process further includes examining at least one of a second instruction, wherein the at least one second instruction is a source of the first instruction. In other words, at least one second instruction from the worklist creates a data output that is used as an source or operand in the first instruction. In this embodiment, the worklist is examined to determine a suitable backward order from the last instruction to the first instruction, thus ensuring that at least one second instruction creates an output that is used as an operand in a subsequent instruction. This method is an iterative process looking at multiple instructions to reduce unnecessary dependencies in the extended SSA form.

As illustrated in block 606, the method also includes determining which instruction outputs write as a source to the same instruction. Similarly, the process requires a determination as to which output components of each phi instruction, if any are present on the worklist, write to the same source as a group. In one embodiment of the disclosure, this may be performed by applying the "Union Find Algorithm" as is well known in the art.

As a result of the determination as shown in block 606, the process transforms the first set of instructions of the worklist into a second plurality of instructions in the extended SSA form, block 608. The second plurality of instructions benefits from having fewer instruction dependencies and can thus be executed more quickly and efficiently by the host computer's compiler. Thereupon, the method is complete, block 610, and the method may operate on a new first plurality of instructions of a worklist stored in memory. The final results of the compiler are subsequently converted into machine code instructions utilizing an SSA form to restore the requisite SSA form instructions to include non-SSA form instructions and assemble the resulting code with a machine-code assembler.

FIGS. 7A-F illustrate a further embodiment of a method for reducing instruction dependencies. Similar to FIG. 6, the method of FIGS. 7A-F is performed by a compiler executing on one or more processing devices (e.g., a host processor) or carried out by any suitable logic to convert program language software code into machine language code. The method begins, as illustrated in block 700, where an initial plurality of instructions in the extended SSA form are received by the compiler, block 702. In one embodiment, the initial plurality of instructions may correspond to the output of the dead code elimination process described above with respect to FIGS. 1-5.

A worklist of critical instructions is then generated and stored in memory, block 704, wherein each instruction of the initial plurality of instructions is analyzed to determine if it produces an export value. In one embodiment, the worklist is stored in the memory of a host processor. However, it is recognized that the worklist may be stored in any suitable memory device of the computing system. If the instruction produces an export value, then the instruction is deemed critical and placed on the worklist. The critical instructions contained within the worklist correspond to a first plurality of instructions in the extended SSA form.

As shown in block 706, the process further includes examining a first instruction and at least one second instruction of the worklist, wherein the output of the at least one second instruction is a source of the first instruction. As illustrated by alpha-numeral "A," this method may further include, in one embodiment, an initialization of a new previous link table in memory of a host processor assigning to each instruction within the table the value "null," block 716 of FIG. 7B.

Figure 7A:
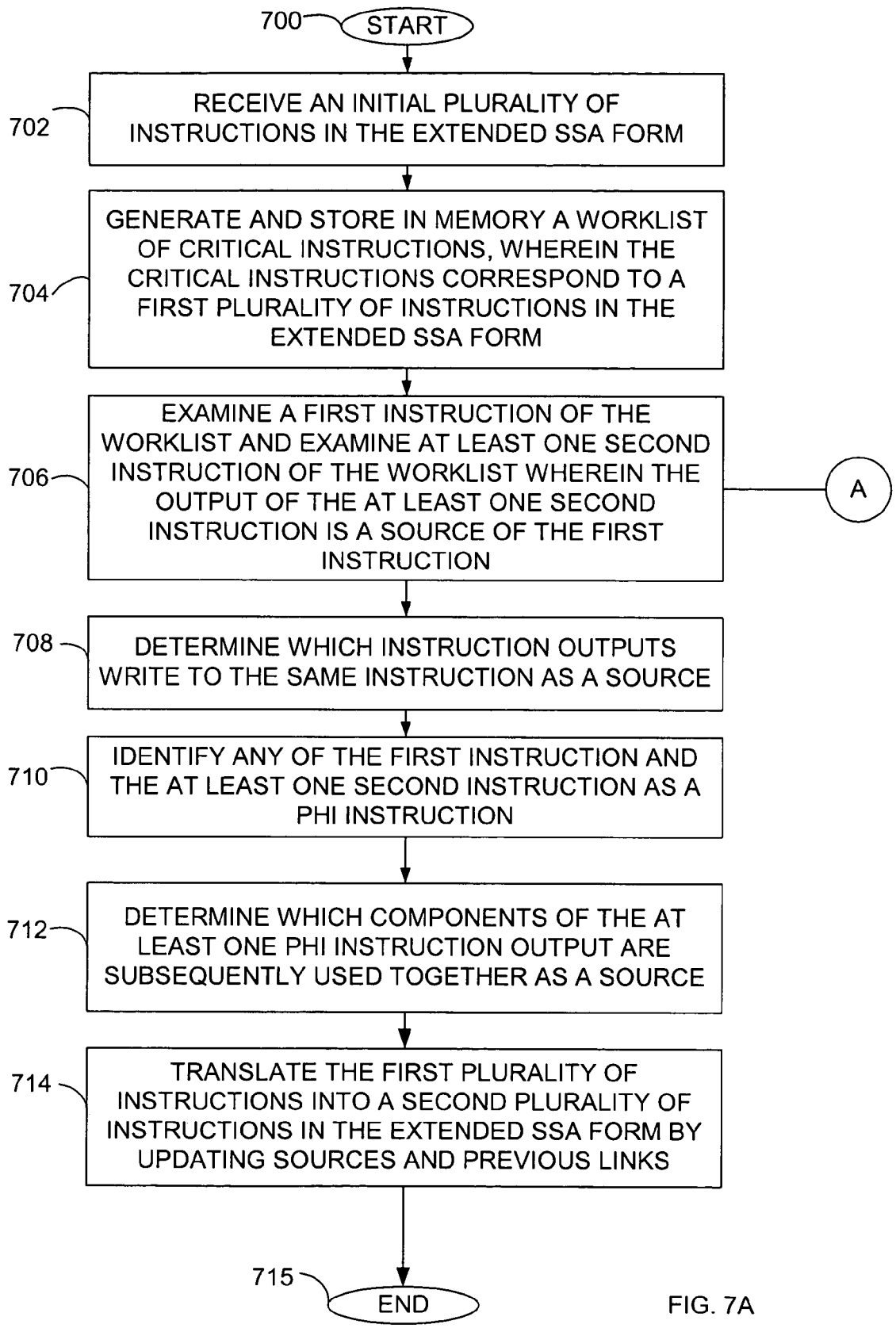
FIGS. 7A-F illustrates a flow chart of a method for reducing instruction dependencies in the extended SSA form in accordance with another embodiment of the present invention.
Figure 7B:
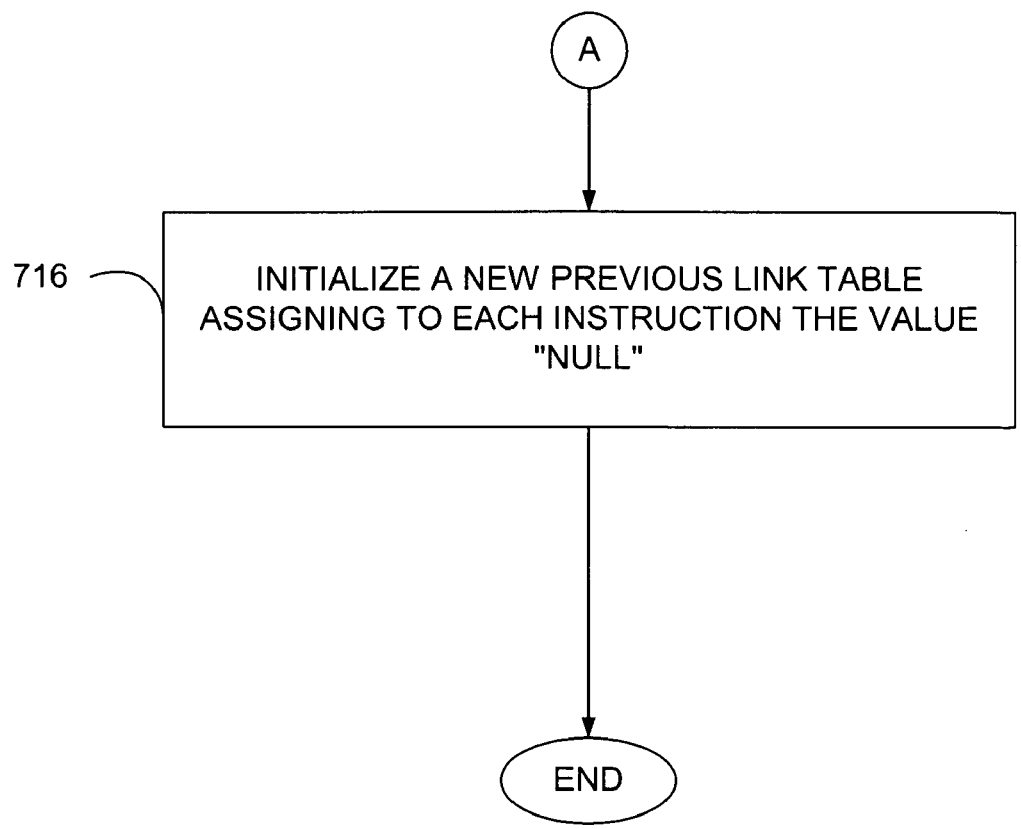

As the method of FIG. 7A continues, a determination is made as to which instruction outputs among the first instruction and the at least one second instruction write as a source to the same instruction, block 708. In one embodiment, this method may be performed by the processes of FIG. 7C beginning with an initialization of an instruction grouping table in memory of a host processor, thereby assigning to each instruction of the first instruction and second instructions a unique group ID number, block 718. The "Union Find Algorithm" is then applied to the first instruction and second instructions to determine which instructions write to the same instruction as a source, block 720. In other words, the algorithm is applied to determine what outputs will be subsequently be used as sources or operands of a later instruction. As stated above, the "Union Find Algorithm" is well known in the art. As illustrated in block 722 and upon application of the algorithm, the instruction grouping table is updated assigning to each instruction that writes as a source to the same instruction a common group ID number.

Returning to FIG. 7A, the method further requires the identification of one or more of the first instruction and the at least one second instruction as a phi instruction as shown in block 710. A phi instruction, as is known in the art, is inserted in a merging node in the control flow graph of the program. At the merging node, several definitions of a variable reach a common node, and the phi instruction is inserted to merge the variables into the definition. Thus, the semantics of static single assignment form are maintained, wherein each output variable is written only once. As utilized throughout this disclosure, the phi instruction nomenclature shall correspond to $a_n = \text{PHI}(a_1, a_2, \ldots a_m)$.

The process continues with respect to block 712 by determining which components of each phi instruction output are subsequently used together as a source in a later instruction. In one embodiment, the method as illustrated in block 712 may include the processes of FIG. 7D, beginning with the initialization of a phi-output grouping table and the assignment to each component of the at least one phi instruction output a unique group ID number, block 724. The method continues by applying the "Union Find Algorithm" as described above to determine which components of each phi instruction output are subsequently used together as a source in a later instruction, block 726. Lastly, the process requires updating the phi-output grouping table by assigning a common group ID number to components that are subsequently used together as a source as shown in block 728.

Returning to block 714 of FIG. 7A, the method translates the first plurality of instructions into a second plurality of instructions in the extended SSA form by updating sources and previous links. In one embodiment, the process may also include identifying in the updated phi-output grouping table which components have the same group ID number, block 730 of FIG. 7E, and splitting each phi instruction into as many phi instructions as there are different group ID numbers in the table, block 732. It is recognized that if there are no common group ID numbers, then the method of block 732 may be avoided altogether, for example, if all components of a phi instruction have the same group id, then that phi instruction is not split, this step can be skipped for that phi instruction.

Figure 7C:
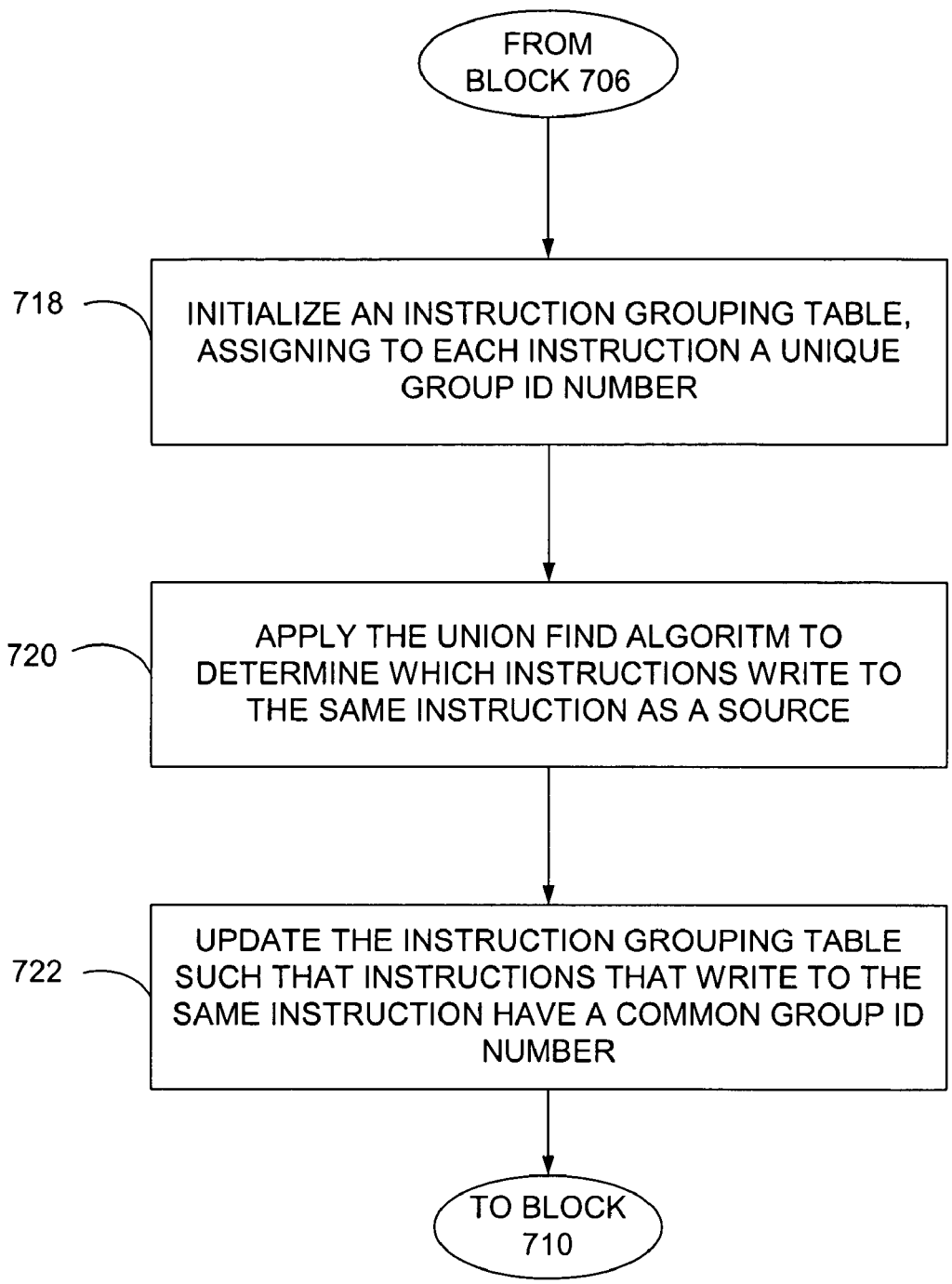
Figure 7D:
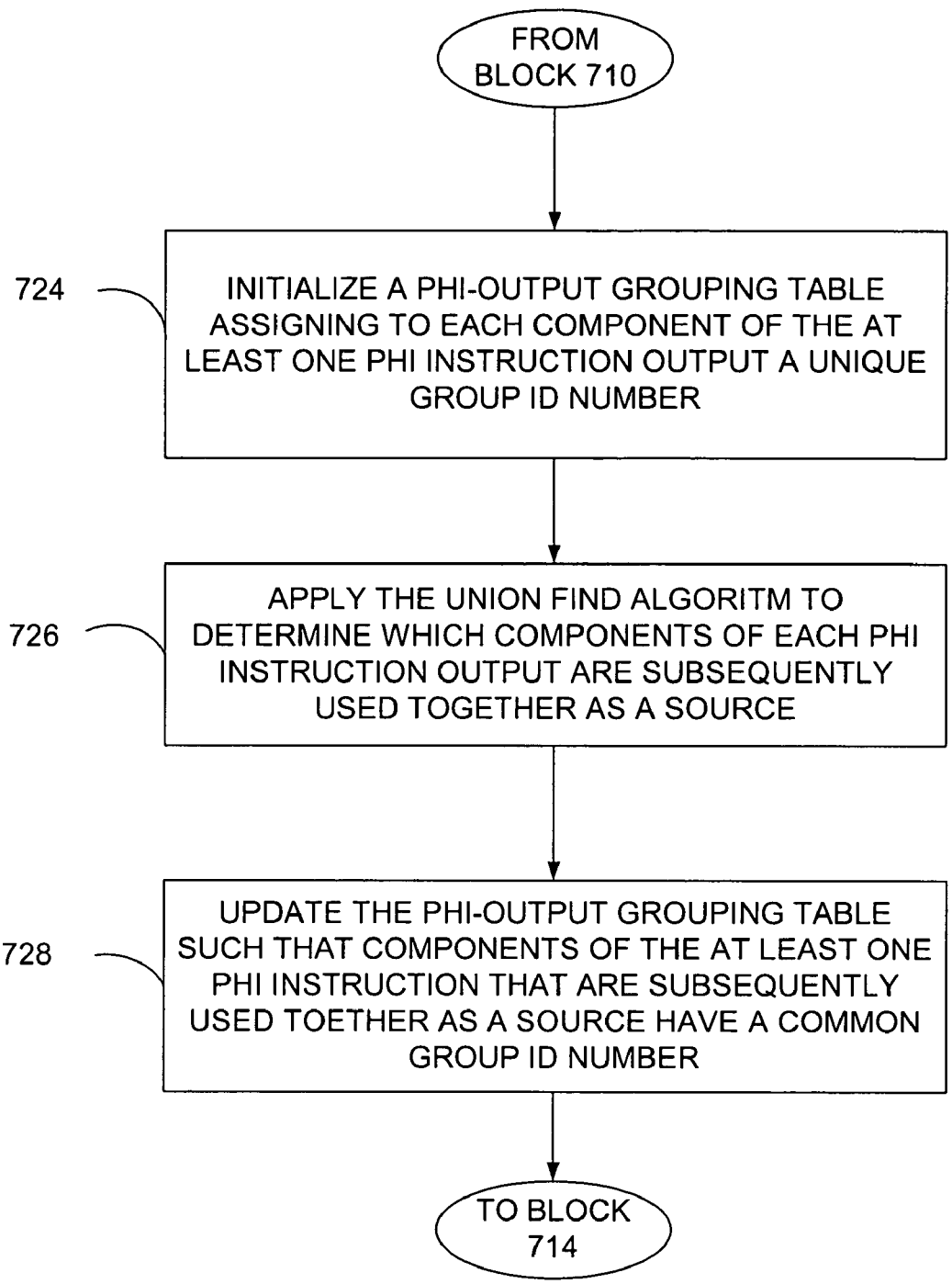
Figure 7E:
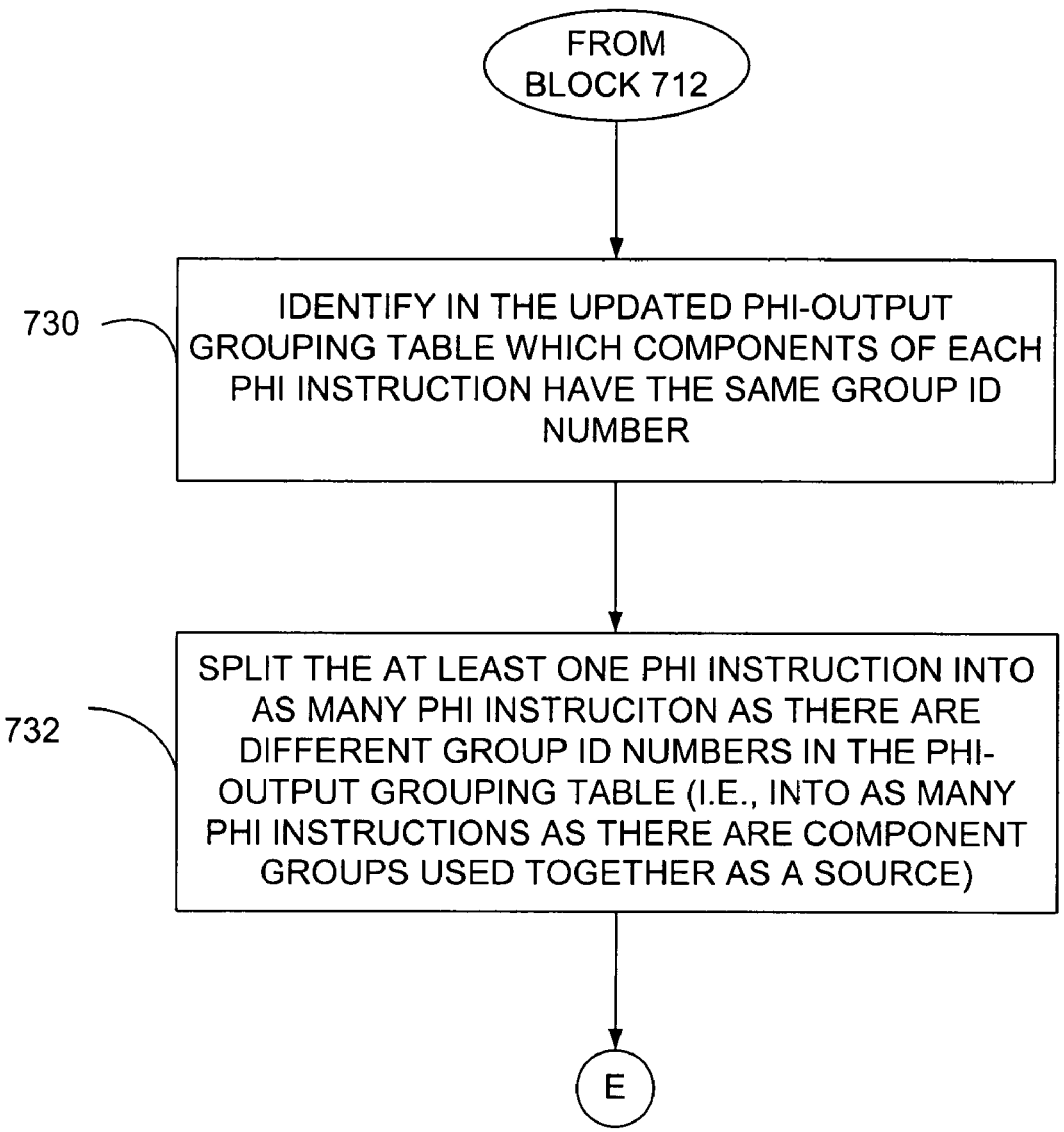
Figure 7F:
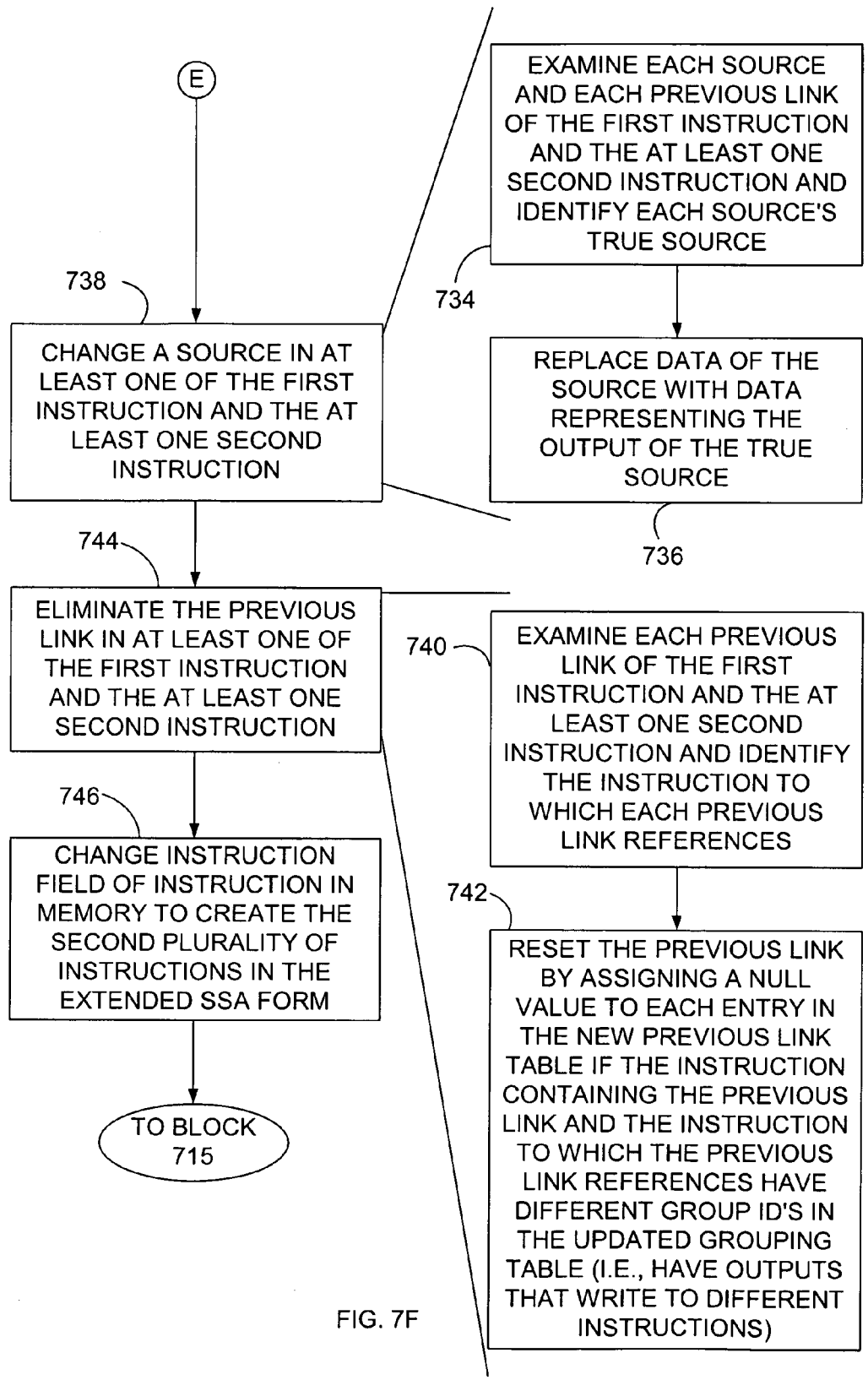

As indicated by alpha-numeral "E" of FIG. 7E, the process may further include the methods of FIG. 7F. As illustrated in block 738, the translation process continues by changing a source in at least one of the first instruction and the at least one second instruction. In one embodiment, the method of block 738 is performed by the processes of blocks 734 and 736. As shown in block 734, the method examines each previous link of the first instruction and the second instructions and further identifies each source's true source. An individual source's true source can be found by "walking" backwards over the previous write links of each instruction to find the instruction that effectively writes the particular source. In other words, the true source is effectively the instruction that provides for the data represented in the previous link. As shown in block 736, the method then replaces data of the source with data representing the output of the true source. In this manner, a source of a given instruction is effectively changed according to the method illustrated in block 738.

The method of FIG. 7F continues as illustrated in block 744 where the process eliminates the previous link in at least one of the first instruction and the at least one second instruction. In one embodiment, the method of block 744 is performed by the processes of blocks 740 and 742. As shown in block 740, the method examines each previous link of the first instruction and the second instructions and subsequent identification of the instruction to which each previous link references. In return, the process resets the previous link by assigning a "null" value to each entry in the new previous link table if the instruction containing the previous link and the instruction to which the previous link references have different group ID numbers in the updated grouping table, block 742. In other words, if the two instructions referenced above have outputs that write to different instructions, then the method sets the previous link to "null."

After splitting the at least one phi instruction into new phi instructions in accordance with block 732 of FIG. 7E and further after changing a source and eliminating a previous link as respectively illustrated in blocks 738 and 744 of FIG. 7F, the method finishes by changing an instruction field (e.g. previous link field) of an instruction stored in memory to create a second plurality of instructions in the extended SSA form, step 746. Among other things, the method illustrated in block 746 utilizes the new previous link table to effectively translate the first plurality of instructions into the second plurality of instructions. Thereupon, the method is complete, block 715 of FIG. 7A, and may operate on a new initial plurality of instructions.

The present disclosure recognizes that the methods of FIGS. 7A-7F are not limited to the sequentially order in which they appear and are described. In contrast and for purposes of illustration, the processes illustrated in blocks 738 and 744 of FIG. 7F may be processed in any desired order. Additionally, it is further recognized that the method of translating the first plurality of instructions into a second plurality of instructions as illustrated in step 714 of FIG. 7A does not require the performance of the processes illustrated in both blocks 738 and 744 of FIG. 7F. In contrast, the present disclosure acknowledges that either process represented by block 738 or 744 may be performed in the translation process.

Figure 8:
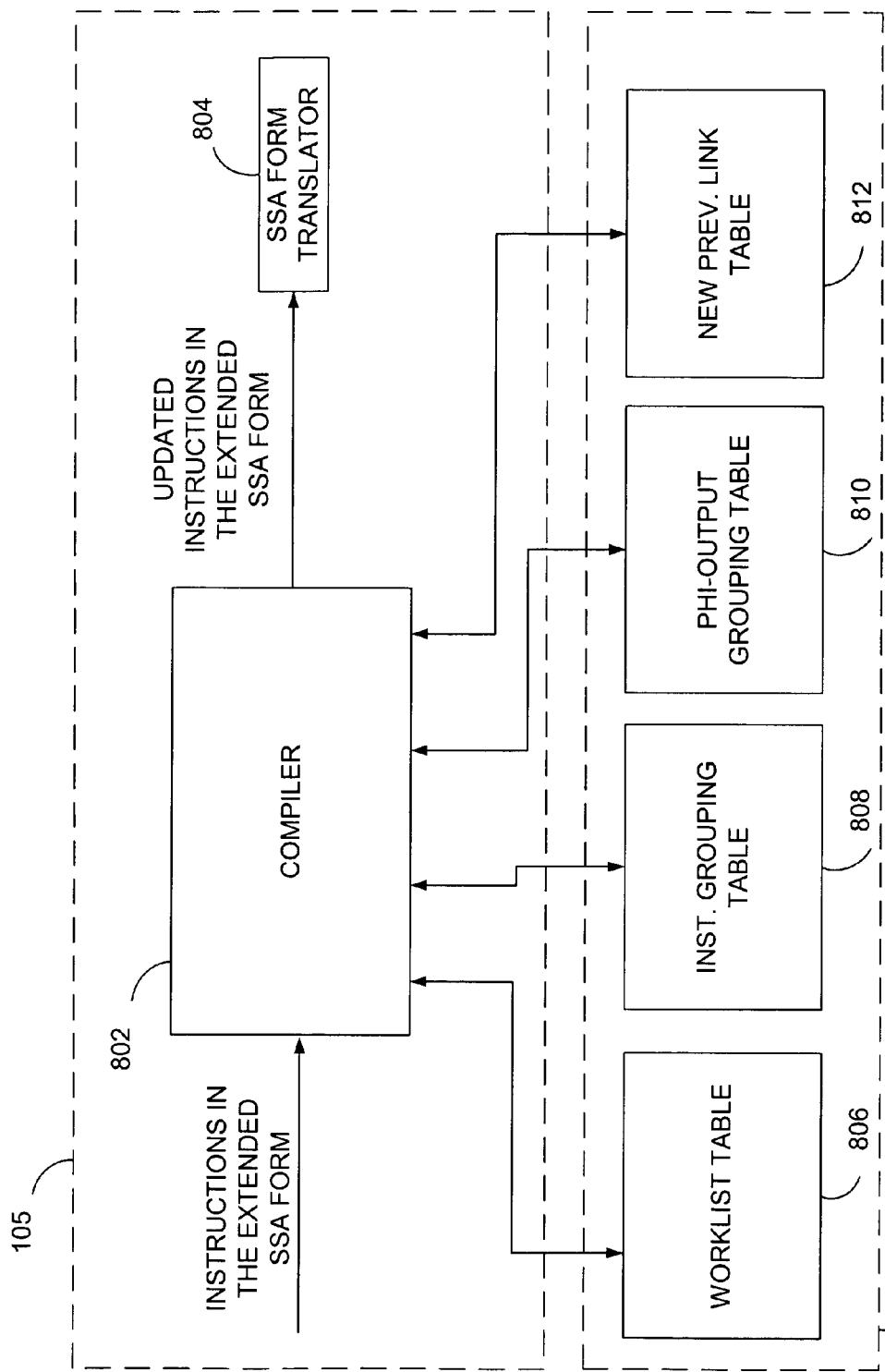
FIG. 8 illustrates a schematic block diagram of an apparatus for reducing instruction dependencies in the extended SSA form in accordance with one embodiment of the present invention.

FIG. 8 illustrates an apparatus for reduction of instructions dependencies in the extended SSA form. A compiler 802 of a processor 150 is illustrated as being operatively coupled to a SSA form translator 804. Additionally, the compiler 802 is operatively coupled to receive instructions in the extended SSA form as input and to produce updated instructions in the extended SSA form as output. Moreover, the compiler 802 is operatively coupled to memory 152 containing a worklist table 806, an instruction grouping table 808, a phi-output grouping table 810, and a new previous link table 812. In this manner, the processor 150 under control of compiler 802 is operative to perform, among other things, the methods illustrated in FIGS. 6 and 7 and the processes discussed above as associated with the methods for reducing instruction dependencies in the extended SSA form.

As stated above, the processor 150 may be, but not limited to, a single processor, a plurality of processors, a DSP, a microprocessor, an ASIC, a state machine, or any implementation capable of processing and executing software. The term processor should not be construed to refer exclusively to hardware capable of executing software, and may implicitly include DSP hardware, ROM for storing software, RAM, and any other volatile or non-volatile storage medium. The memory may be, but not limited to, a single memory, a plurality of memory locations, shared memory, CD, DVD, ROM, RAM, EEPROM, optical storage, microcode or any other non-volatile storage capable of storing digital data for use by the processor 150.

FIG. 8 shall be described in greater detail with respect to FIGS. 9A-F wherein a sample first plurality of instructions is translated according to one method of the present invention into a second plurality of instructions.

Figure 9A:
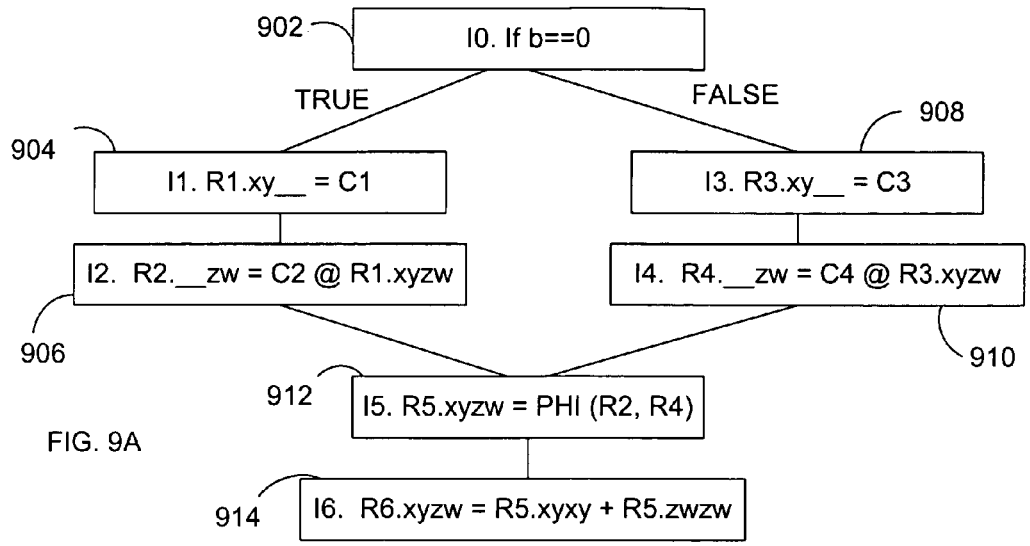
FIG. 9A illustrates a graphical representation of a first plurality of instructions in the extended SSA form.
Figure 9B:
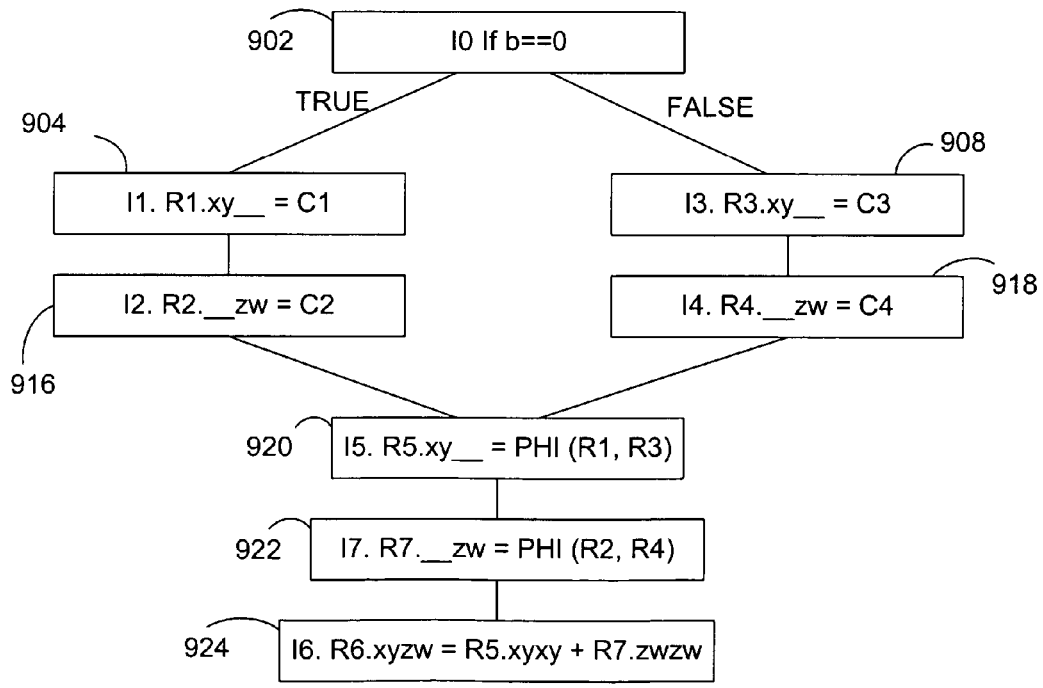
FIG. 9B illustrates a graphical representation of an updated second plurality of instructions in the extended SSA form after reducing instruction dependencies associated with the first plurality of instructions of FIG. 9A in accordance with one embodiment of the present invention.

FIG. 9A illustrates a graphical representation of a series of instructions 902-914 representing, in one embodiment, a first plurality of instructions in the extended SSA form. Each instruction is numbered "0" through "6" using the nomenclature "I0" through "I6." Similarly, FIG. 9B illustrates a graphical representation of a series of instruction 902-904, 908, 916-924 representing, in one embodiment, a second plurality of instructions in the extended SSA form as translated from the instructions of FIG. 9A. As the process is explained periodic reference shall be made to both FIGS. 9A-9B, the processes of FIGS. 7A-7F and FIGS. 9C-9F, representative of memory utilized in the process.

Generally, instruction 902 begins the series of instructions in FIG. 9A with a branch node 902 containing a Boolean operation. If the output is true, the branch node directs the program to execute instructions 904 and 906. If the output of Boolean operation 902 is false, the branch node directs the program to execute instructions 908 and 910.

Instruction 912 corresponds to a phi instruction as indicated by the nomenclature used. At instruction 912, the outputs of instruction 906 and instruction 910 merge to maintain the semantics of the static single assignment form. Briefly, the phi instruction 912 writes to R5.xyzw the output of either instruction 906 or instruction 910, but not both. The phi instruction 912 anticipates the output of the Boolean operation 902 and utilizes as a source the correct output of instructions 906 and 910. Lastly, instruction 914 utilizes two source swizzles to write to R6.xyzw. In instruction 914, sources R5.xyxy and R5.zwzw are created on-the-fly by swizzle commands operating independently on the operands.

FIG. 9C illustrates, among other things, the worklist memory 806 storing a table of the first plurality of instructions as provided in FIG. 9A and further indexed by instruction number. In one embodiment, the method for reducing instruction dependencies in the extended SSA form begins by examining a first instruction and at least one second instruction of the worklist and initializing a new previous link table 812 according to the methods illustrated in blocks 706 and 716 of FIGS. 7A and 7B, respectively. FIG. 9D provides an example of, among other things, initialized "null" values assigned to each instruction number in the new previous link table 812.

The process continues by determining which instruction outputs write as a source to the same instruction as shown by blocks 708 of FIG. 7A and 718-722 of FIG. 7C. An instruction grouping table 808 is initialized as illustrated in FIG. 9E assigning to each instruction a unique group ID number. The "Union Find Algorithm" is applied, and an updated instruction grouping table 808 is created. In this example, no instruction outputs write to the same instruction as a source, and therefore the group ID number of each instruction remains unique.

The process then includes identifying instruction 912 as a phi instruction and the process continues to determine which components of phi instruction 912 are subsequently used together as a source, blocks 710 and 712. In the process, a phi-output grouping table 812 is initialized assigning to each component a unique group ID, block 724 of FIG. 7D. After applying the "Union Find Algorithm," the process updates each entry in the phi-output grouping table 810 assigning to components a common group ID number when it is determined that the components are subsequently used together as a source, blocks 726 and 728 of FIG. 7D. In this example, components "x" and "y" will share a common group ID, and similarly, components "z" and "w"0 share a common group ID because of their use together is instruction 914.

To complete the process and translate the first plurality of instructions into a second plurality of instructions in the extended SSA form, according to block 714 of FIG. 7A, the process continues by splitting phi instruction 912 into two new instructions, blocks 730 and 732 of FIG. 7E. The two new instructions correspond to the two component groups associated with phi instruction 912 as indicated in the phi-output grouping table 810. As indicated by FIG. 9B, illustrative of the output of compiler 802 and representative of a second plurality of instructions in the extended SSA form, instructions 920 and 922 correspond to the two new phi instructions. The new phi instructions are written to provide the sources of subsequent instruction 902. In this manner, the first new phi instruction 920 will provide source R5.xyxy and the second new phi instruction 922 will provide source R5.zwzw.

Returning to the process with respect to FIG. 9A, each source and each previous link of instructions 902-914 are examined in accordance with block 734 of FIG. 7F. The process includes identifying each source's true source and then replacing the source with its true source, block 736, if necessary. In this example and to maintain the semantics of static single assignment, R5.zwzw will be renamed R7.zwzw in the updated second plurality of instructions. As a result, the second new phi instruction 922 will write to R7.zwzw, and instruction 924, corresponding to initial instruction 914, will utilize R7.zwzw as a source instead of R5.zwzw.

Next, the method continues by examining each of the previous links and identifying the instruction to which each previous link references, block 740. Because each updated group ID number in the instruction grouping table 808 is unique, every previous link is unnecessary and can be eliminated by setting to "null" each entry of the new previous link table 812 of FIG. 9D, block 742.

Therefore, in accordance with block 746, the second plurality of instructions in the extended SSA form are created by updating sources and eliminating previous in accordance with the methods of blocks 738 and 744. Additionally, new phi instructions are created thereby replacing all instances of R5.zwzw with R7.zwzw. One of ordinary skill in the art can appreciate that instructions 916 and 918 are stripped of their previous write links as reflected in worklist 806 of FIG. 9C and the second plurality of instructions illustrated in FIG. 9B.

As such, the present invention provides for the reduction of instruction dependencies in the extended SSA form. By changing instruction sources and eliminating unnecessary previous links, the plurality of instructions can be executed more efficiently. Moreover, the instructions benefit from fewer constrains by allowing non-sequential execution of instructions and allowing components to be assigned to different physical registers. As a result, the host processor can more quickly and efficiently execute the instructions. For example, programs may be compiled that have fewer instructions and therefore can run faster, or programs that use fewer registers. Because each program can use fewer registers and since graphics processors or other processors can operate as multi-thread processors, more instances of programs can run simultaneously, and the system can get better through-put.

It should be understood that the implementation of other variations and modifications of the invention in its various aspects will be apparent to those of ordinary skill in the art and that the invention is not limited by the specific embodiments described herein. For example, the superword register may contain any suitable number of components and thereby the write mask contains the corresponding number of bits to allow for the effect management of any number of components in compiler operations, such as swizzles. It is therefore contemplated to cover by the present invention, any and all modifications, variations, or equivalents that fall within the spirit and scope of the basic underlying principles disclosed and claimed herein.

What is claimed:

1. A method for reducing instruction dependencies for instructions in extended static single assignment (SSA) form that are converted from instructions that utilize superword registers, the method comprising:

examining, by a processor, a first instruction stored in memory, identified by a worklist wherein the worklist identifies a first plurality of instructions in the extended SSA form, and wherein each instruction of the first plurality of instructions includes data representing a source, a previous link and a write mask, and produces a data output;

examining, by said processor, at least one second instruction identified in the worklist, wherein the output of said at least one second instruction is a source of the first instruction; and translating by said processor the first plurality of instructions into a second plurality of instructions in the extended SSA form, wherein the second plurality of instructions contains fewer instruction dependencies than said first plurality of instructions, wherein said method of translating said first plurality of instructions into said second plurality of instructions further includes:
  identifying at least one of the first instruction and the at least one second instruction as a phi instruction; and
  splitting said at least one phi instruction into two or more phi instructions, wherein said method of splitting said at least one phi instruction into two or more phi instructions further includes;
  determining which components of each phi instruction output are subsequently used together as a source; and
  deleting each phi instruction and creating as many new phi instructions as there are different component groups subsequently used together as a source.

2. The method of claim 1 further comprising:
generating by said processor the worklist by:
  receiving an initial plurality of instructions in the extended SSA form;
  determining if each instruction of the initial plurality of instructions is a critical instruction that generates an export value; and
  adding a pointer to said each instruction of the initial plurality of instructions to the worklist if said each instruction of the initial plurality of instructions is a critical instruction.

3. The method of claim 1, wherein the method of examining the first instruction and the at least one second instruction farther includes determining which outputs of the first instruction and the at least one second instruction write to the same instruction as a source.

4. The method of claim 1, wherein the method of translating the first plurality of instructions into said second plurality of instructions further includes changing data in a source in at least one of the first instruction and the at least one of the second instruction.

5. The method of claim 4, wherein the method of changing data in a source in at least one of the first instruction and the at least one second instruction further includes:
  examining each source and each previous link of the first instruction and the at least one second instruction and identifying its true source; and
  replacing data of the source with data representing the output of its true source.

6. The method of claim 1, wherein the method of translating the first plurality of instructions into said second plurality of instructions further includes eliminating the previous link in at least one of the first instruction and the at least one second instruction.

7. The method of claim 6, wherein the method of eliminating the previous link in at least one of the first instruction and the at least one second instruction further includes:
  examining each previous link of the first instruction and the at least one second instruction and identifying which instruction each previous link references; and
  resetting the previous link if the instruction containing the previous link and the instruction to which the previous link references have outputs that write to different superword registers.

8. Memory containing instructions executable by one or more processors that when executed by said one or more processors causes the one or more processors to:
  examine a first instruction in said memory that is identified in a worklist stored in said memory, wherein the worklist includes pointers to a first plurality of instructions in extended SSA form that were converted from instructions that utilize superword registers, and wherein each instruction of the first plurality of instructions includes data representing a source, previous link and a write mask, and produces a data output;
  examine at least one second instruction identified by the worklist, wherein said at least one second instruction is a source of the first instruction; and
  translate the first plurality of instructions into a second plurality of instructions in the extended SSA form, wherein the second plurality of instructions contains fewer instruction dependencies than said first plurality of instructions:
  translate said first plurality of instructions into a second plurality of instructions by;
  identifying at least one of said first instruction and said at least one second instruction as a phi instruction; and
  splitting said at least one phi instruction into two or more phi instructions by;
  determining which components of each phi instruction output are subsequently used together as a source; and
  deleting each phi instruction and creating as many new phi instructions as there are different component groups subsequently used together as a source.

9. Memory of claim 8 further containing instructions executable by one or more processors that when executed by said one or more processors causes the one or more processors to:
  generate the worklist by:
    receiving an initial plurality of instructions in the extended SSA form;
    determining if each instruction of the initial plurality of instructions is a critical instruction that generates an export value; and
    adding a pointer to said each instruction of the initial plurality of instructions to the worklist if said each instruction of the initial plurality of instructions is a critical instruction.

10. Memory of claim 8 further containing instructions executable by one or more processors that when executed by said one or more processors causes the one or more processors to:
  examine the first instruction and the at least one second instruction by determining which outputs of the first instruction and the at least one second instruction write to the same instruction as a source.

11. Memory of claim 8 further containing instructions executable by one or more processors that when executed by said one or more processors causes the one or more processors to:
  translate the first plurality of instructions into said second plurality of instructions by changing data in a source in at least one of the first instruction and the at least one of the second instruction.

12. Memory of claim 11 further containing instructions executable by one or more processors that when executed by said one or more processors causes the one or more processors to:
  change data in a source in at least one of the first instruction and the at least one second instruction by:
    examining each source and each previous link of the first instruction and the at least one second instruction and identifying its true source; and
    replacing data of the source with data representing the output of its true source instruction.

13. Memory of claim 8 further containing instructions executable by one or more processors that when executed by said one or more processors causes the one or more processors to:

translate the first plurality of instructions into a second plurality of instructions by eliminating the previous link in at least one of the first instruction and the at least one second instruction.

14. Memory of claim 13 further containing instructions executable by one or more processors that when executed by said one or more processors causes the one or more processors to:
   eliminate the previous link in at least one of the first instruction and the at least one second instruction by:
      examining each previous link of the first instruction and the at least one second instruction and identifying which instruction each previous link references; and
      resetting the previous link if the instruction containing the previous link and the instruction to which the previous link references have outputs that write to different superword registers.

15. An apparatus for reducing instruction dependencies in extended static single assignment (SSA) form that are converted from instructions that utilize superword registers, the apparatus comprising:
   at least one memory device storing a plurality of executable instructions; and
   at least one processor operably coupled to the at least one memory device, operative to:
   examine a first instruction of a worklist stored in said at least one memory device, wherein the worklist includes a first plurality of instructions in the extended S SA form, and wherein each instruction of the first plurality of instructions includes data representing a source, a previous link and a write mask, and produces a data output;
   examine at least one second instruction of the worklist, wherein said at least one second instruction is a source of the first instruction; and
   translate the first plurality of instructions into a second plurality of instructions in the extended SSA form, wherein the second plurality of instructions contains less instruction dependencies than said first plurality of instructions, wherein said translating said first plurality of instructions into said second plurality of instructions is performed by:
      identifying at least one of said first instruction and said at least one second instruction as a phi instruction; and
      splitting said at least one phi instruction into two or more phi instructions by;
      determining which components of each phi instruction are subsequently used together as a source; and
      deleting each phi instruction and creating as many phi instructions as there are different component groups subsequently used together as a source.

16. The apparatus of claim 15 wherein the at least one processor further in response to the executable instructions:
   generates the worklist by:
      receiving an initial plurality of instructions in the extended SSA form;
      determining if each instruction of the initial plurality of instructions is a critical instruction that generates an export value; and
      writing said each instruction of the initial plurality of instructions to the worklist if said each instruction of the initial plurality of instructions is a critical instruction.

17. The apparatus of claim 15 wherein the at least one processor further in response to the executable instructions:
   examines the first instruction and the at least one second instruction by determining which outputs of the first instruction and the at least one second instruction write to the same instruction as a source.

18. The apparatus of claim 15 wherein the at least one processor further in response to the executable instructions:
   translates the first plurality of instructions into said second plurality of instructions by changing data in a source in at least one of the first instruction and the at least one of the second instruction.

19. The apparatus of claim 18 wherein the at least one processor further in response to the executable instructions:
   changes data in a source in at least one of the first instruction and the at least one second instruction by:
      examining each source and each previous link of the first instruction and the at least one second instruction and identifying its true source; and
      replaces data of the source with data representing the output of its true source instruction.

20. The apparatus of claim 15 wherein the at least one processor further in response to the executable instructions:
   translates the first plurality of instructions into said second plurality of instructions by eliminating the previous link in at least one of the first instruction and the at least one second instruction.

21. The apparatus of claim 20 wherein the at least one processor further in response to the executable instructions:
   eliminates the previous link in at least one of the first instruction and the at least one second instruction by:
      examining each previous link of the first instruction and the at least one second instruction and identifying which instruction each previous link references; and
      resetting the previous link if the instruction containing the previous link and the instruction to which the previous link references have outputs that write to different superword registers.

22. A method for reducing instruction dependencies for instructions in extended static single assignment (SSA) form that are converted from instructions that utilize superword registers, said method comprising:
   examining, by a processor, a first instruction stored in memory, identified by a worklist wherein said worklist identifies a first plurality of instructions in said extended SSA form, and wherein each instruction of said first plurality of instructions includes data representing a source, a previous link and a write mask, and produces a data output;
   examining, by a processor, at least one second instruction identified in said worklist, wherein said output of said at least one second instruction is a source of said first instruction; and
   translating by said processor said first plurality of instructions into a second plurality of instructions in said extended SSA form, wherein said second plurality of instructions contains fewer instruction dependencies than said first plurality of instructions, and wherein said method of translating said first plurality of instructions into said second plurality of instructions further includes eliminating said previous link in at least one of said first instruction and said at least one second instruction, and wherein said method of eliminating said previous link in at least one of said first instruction and said at least one second instruction further includes:
   examining each previous link of said first instruction and said at least one second instruction and identifying which instruction each previous link references; and resetting said previous link if said instruction containing said previous link and said instruction to which said previous link references have outputs that write to different superword registers.

23. The method of claim 22 further comprising:
generating by said processor the worklist by:
receiving an initial plurality of instructions in the extended SSA form;
determining if each instruction of the initial plurality of instructions is a critical instruction that generates an export value; and
adding a pointer to said each instruction of the initial plurality of instructions to the worklist if said each instruction of the initial plurality of instructions is a critical instruction.

24. The method of claim 22, wherein the method of examining the first instruction and the at least one second instruction farther includes determining which outputs of the first instruction and the at least one second instruction write to the same instruction as a source.

25. The method of claim 22, wherein the method of examining the first instruction and the at least one second instruction further includes:
identifying at least one of the first instruction and the at least one second instruction as a phi instruction; and
determining which components of the phi instruction output are subsequently used together as a source.

26. The method of claim 22, wherein the method of translating the first plurality of instructions into said second plurality of instructions farther includes:
identifying at least one of the first instruction and the at least one second instruction as a phi instruction; and
splitting the at least one phi instruction into two or more phi instructions.

27. The method of claim 26, wherein the method of splitting the at least one phi instruction into two or more phi instructions further includes:
determining which components of each phi instruction output are subsequently used together as a source; and
deleting each phi instruction and creating as many new phi instructions as there are different component groups subsequently used together as a source.

28. The method of claim 22, wherein the method of translating the first plurality of instructions into said second plurality of instructions further includes changing data in a source in at least one of the first instruction and the at least one of the second instruction.

29. The method of claim 28, wherein the method of changing data in a source in at least one of the first instruction and the at least one second instruction further includes:
examining each source and each previous link of the first instruction and the at least one second instruction and identifying its true source; and
replacing data of the source with data representing the output of its true source.

30. Memory containing instructions executable by one or more processors that when executed by said one or more processors causes said one or more processors to:
examine a first instruction in said memory that is identified in a worklist stored in said memory, wherein said worklist includes pointers to a first plurality of instructions in extended SSA form that were converted from instructions that utilize superword registers, and wherein each instruction of said first plurality of instructions includes data representing a source, previous link and a write mask, and produces a data output;
examine at least one second instruction identified by said worklist, wherein said at least one second instruction is a source of said first instruction;
translate said first plurality of instructions into a second plurality of instructions in said extended SSA form, wherein said second plurality of instructions contains fewer instruction dependencies than said first plurality of instructions;
translate said first plurality of instructions into a second plurality of instructions by eliminating said previous link in at least one of said first instruction and said at least one second instruction; and
eliminate said previous link in at least one of said first instruction and said at least one second instruction by:
examining each previous link of said first instruction and said at least one second instruction and identifying which instruction each previous link references; and
resetting said previous link if said instruction containing said previous link and said instruction to which said previous link references have outputs that write to different superword registers.

31. Memory of claim 30 further containing instructions executable by one or more processors that when executed by said one or more processors causes the one or more processors to:
generate the worklist by:
receiving an initial plurality of instructions in the extended SSA form;
determining if each instruction of the initial plurality of instructions is a critical instruction that generates an export value; and
adding a pointer to said each instruction of the initial plurality of instructions to the worklist if said each instruction of the initial plurality of instructions is a critical instruction.

32. Memory of claim 30 further containing instructions executable by one or more processors that when executed by said one or more processors causes the one or more processors to:
examine the first instruction and the at least one second instruction by determining which outputs of the first instruction and the at least one second instruction write to the same instruction as a source.

33. Memory of claim 30 further containing instructions executable by one or more processors that when executed by said one or more processors causes the one or more processors to:
examine the first instruction and the at least one second instruction by:
identifying at least one of the first instruction and the at least one second instruction as a phi instruction; and
determining which components of the phi instruction output are subsequently used together as a source.

34. Memory of claim 30 further containing instructions executable by one or more processors that when executed by said one or more processors causes the one or more processors to:
translate the first plurality of instructions into a second plurality of instructions by:
identifying at least one of the first instruction and the at least one second instruction as a phi instruction; and
splitting the at least one phi instruction into two or more phi instructions.

35. Memory of claim 34 further containing instructions executable by one or more processors that when executed by said one or more processors causes the one or more processors to:

split the at least one phi instruction into two or more phi
   instructions by:
  determining which components of each phi instruction
   output are subsequently used together as a source; and
  deleting each phi instruction and creating as many new phi
   instructions as there are different component groups
   subsequently used together as a source.

36. Memory of claim 30 further containing instructions executable by one or more processors that when executed by said one or more processors causes the one or more processors to:
  translate the first plurality of instructions into said second plurality of instructions by changing data in a source in at least one of the first instruction and the at least one of the second instruction.

37. Memory of claim 36 further containing instructions executable by one or more processors that when executed by said one or more processors causes the one or more processors to:
  change data in a source in at least one of the first instruction and the at least one second instruction by:
   examining each source and each previous link of the first instruction and the at least one second instruction and identifying its true source; and
   replacing data of the source with data representing the output of its true source instruction.

38. An apparatus for reducing instruction dependencies in extended static single assignment (SSA) form that are converted from instructions that utilize superword registers, said apparatus comprising:
  at least one memory device storing a plurality of executable instructions; and
  at least one processor operably coupled to said at least one memory device, operative to;
   examine a first instruction of a worklist stored in said at least one memory device, wherein said worklist includes a first plurality of instructions in said extended SSA form,
   and wherein each instruction of said first plurality of instructions includes data representing a source, a previous link and a write mask, and produces a data output;
   examine at least one second instruction of said worklist, wherein said at least one second instruction is a source of said first instruction; and
   translate said first plurality of instructions into a second plurality of instructions in said extended SSA form, wherein said second plurality of instructions contains less instruction dependencies than said first plurality of instructions, wherein said translating said first plurality of instructions into said second plurality of instructions is performed by:
    eliminating said previous link in at least one of said first instruction and said at least one second instruction by:
     examining each previous link of said first instruction and said at least one second instruction and identifying which instruction each previous link references; and
     resetting said previous link if said instruction containing said previous link and said instruction to which said previous link references have outputs that write to different superword registers.

39. The apparatus of claim 38 wherein the at least one processor further in response to the executable instructions:
  generates the worklist by:
   receiving an initial plurality of instructions in the extended SSA form;
   determining if each instruction of the initial plurality of instructions is a critical instruction that generates an export value; and
   writing said each instruction of the initial plurality of instructions to the worklist if said each instruction of the initial plurality of instructions is a critical instruction.

40. The apparatus of claim 38 wherein the at least one processor further in response to the executable instructions:
  examines the first instruction and the at least one second instruction by determining which outputs of the first instruction and the at least one second instruction write to the same instruction as a source.

41. The apparatus of claim 38 wherein the at least one processor farther in response to the executable instructions:
  examines the first instruction and the at least one second instruction by:
   identifying at least one of the first instruction and the at least one second instruction as a phi instruction; and
   determining which components of the phi instruction output are subsequently used together as a source.

42. The apparatus of claim 38 wherein the at least one processor further in response to the executable instructions:
  translates the first plurality of instructions into said second plurality of instructions by:
   identifying at least one of the first instruction and the at least one second instruction as a phi instruction; and
   splitting the at least one phi instruction into two or more phi instructions.

43. The apparatus of claim 42 wherein the at least one processor further in response to the executable instructions:
  splits the at least one phi instruction into two or more phi instructions by:
   determining which components of each phi instruction are subsequently used together as a source; and
   deleting each phi instruction and creating as many phi instructions as there are different component groups subsequently used together as a source.

44. The apparatus of claim 38 wherein the at least one processor further in response to the executable instructions:
  translates the first plurality of instructions into said second plurality of instructions by changing data in a source in at least one of the first instruction and the at least one of the second instruction.

45. The apparatus of claim 44 wherein the at least one processor further in response to the executable instructions:
  changes data in a source in at least one of the first instruction and the at least one second instruction by:
   examining each source and each previous link of the first instruction and the at least one second instruction and identifying its true source; and
   replaces data of the source with data representing the output of its true source instruction.

* * * * *